(12) United States Patent
Tanada et al.

(10) Patent No.: US 6,825,145 B2
(45) Date of Patent: Nov. 30, 2004

(54) EXHAUST GAS PURIFYING CATALYST

(75) Inventors: Hiroshi Tanada, Okazaki (JP); Osamu Nakayama, Toyota (JP); Keisuke Tashiro, Okazaki (JP); Kinichi Iwachido, Aichi (JP); Tetsuya Watanabe, Okazaki (JP); Kazuo Koga, Okazaki (JP)

(73) Assignee: Mitsubishi Jidosha Kogyo Kabushiki Kaisha

( * ) Notice: Subject to any disclaimer, the term of this patent is extended or adjusted under 35 U.S.C. 154(b) by 0 days.

(21) Appl. No.: 10/452,206

(22) Filed: Jun. 2, 2003

(65) Prior Publication Data

US 2003/0211939 A1 Nov. 13, 2003

Related U.S. Application Data

(63) Continuation of application No. 09/907,472, filed on Jul. 17, 2001, now abandoned.

(30) Foreign Application Priority Data

Jul. 17, 2000 (JP) ........................................ 2000-216313

(51) Int. Cl.⁷ .......................... B01J 29/06; B01J 23/02; B01J 23/04; B01J 23/20; B01J 23/08
(52) U.S. Cl. ........................ 502/64; 502/305; 502/308; 502/309; 502/310; 502/311; 502/312; 502/317; 502/320; 502/322; 502/323; 502/344; 502/349; 502/351; 502/352; 502/354; 502/355; 502/527.12; 502/527.13
(58) Field of Search ......................... 502/64, 305, 308, 502/309, 310, 311, 312, 317, 320, 322, 323, 344, 349, 351, 352, 354–355, 527.12, 527.13

(56) References Cited

U.S. PATENT DOCUMENTS

| | | | |
|---|---|---|---|
| 5,185,305 A | 2/1993 | Subramanian et al. | 502/65 |
| 5,264,200 A | 11/1993 | Felthouse et al. | 423/522 |
| 5,384,110 A | 1/1995 | Muramatsu et al. | 423/239.1 |
| 5,494,878 A | 2/1996 | Murakami et al. | 502/304 |
| 5,543,124 A | 8/1996 | Yokota et al. | 423/239.1 |
| 5,559,073 A | 9/1996 | Hu et al. | 502/302 |
| 5,849,254 A | 12/1998 | Suzuki et al. | 423/213.5 |
| 5,853,679 A | 12/1998 | Tabata et al. | 423/213.2 |
| 5,884,473 A | 3/1999 | Noda et al. | 60/274 |
| 5,911,960 A | 6/1999 | Miyoshi et al. | 423/213.5 |
| 5,911,961 A | 6/1999 | Horiuchi et al. | 423/213.5 |
| 5,948,376 A | 9/1999 | Miyoshi et al. | 423/213.5 |
| 6,025,297 A | 2/2000 | Ogura et al. | 502/300 |
| 6,139,808 A | 10/2000 | Mizuno et al. | 422/180 |
| 6,149,877 A | 11/2000 | Ogai | 422/180 |
| 6,159,897 A | 12/2000 | Suzuki et al. | 502/351 |
| 6,217,831 B1 | 4/2001 | Suzuki et al. | 422/177 |
| 6,221,804 B1 | 4/2001 | Yamada et al. | 502/326 |
| 6,426,316 B2 | 7/2002 | Tanaka et al. | 502/340 |
| 6,537,946 B1 | 3/2003 | Tanada et al. | 502/344 |
| 2002/0022573 A1 | 2/2002 | Tanada | |

FOREIGN PATENT DOCUMENTS

| | | |
|---|---|---|
| EP | 0 931 590 A1 | 7/1999 |
| EP | 1 004 347 A2 | 5/2000 |
| EP | 1 008 378 A1 | 6/2000 |

*Primary Examiner*—Cam N. Nguyen
(74) *Attorney, Agent, or Firm*—Rossi & Associates

(57) ABSTRACT

The present invention provides an exhaust gas purifying catalyst that is capable of substantially reducing the degree of deterioration in an exhaust gas purifying capability, which results from dissipation of an absorbent agent. Accordingly, an exhaust gas purifying catalyst, which includes a carrier and a catalyst layer, and to which at least one material selected from a group of alkali metals and alkali earth metals is added as an absorbent agent, is characterized in that acid material with a high affinity with respect to the absorbent agent is mixed in the catalyst layer so as to fix the absorbent agent, and an inhibiting layer is formed between the catalyst layer and the carrier so as to inhibit the movement of the absorbent agent toward the carrier.

14 Claims, 6 Drawing Sheets

# EXHAUST GAS PURIFYING CATALYST

This application conformation of Ser. No. 09/907,472 filed on Jul. 17,2001

FIELD OF THE INVENTION

This invention relates generally to an exhaust gas purifying catalyst, and more particularly to an exhaust gas purifying catalyst with excellent exhaust purifying capability and durability.

BACKGROUND OF THE INVENTION

A lean combustion type engine such as a lean bum engine and a direct injection type engine is operated at a lean air-fuel ratio, which is a lower ratio of fuel to air than a stoichiometrical air-fuel ratio, in a predetermined operating range. While the engine is operated at the lean air-fuel ratio, a three-way catalyst cannot satisfactorily purify NOx (nitrogen oxide) in exhaust gases. Accordingly, it is known that the engine is equipped with an NOx catalyst for absorbing NOx in exhaust gases in an oxide atmosphere, and the NOx absorbed by the NOx catalyst is reduced into $N_2$ (nitrogen) in a reduced atmosphere so as to decrease an NOx output into the air. For example, potassium (K) is added as an NOx absorbent agent to the above-mentioned occlusion type lean NOx catalyst in order to improve an NOx absorbing performance as disclosed in Japanese laid-open Patent Publication No. 9-85093.

If, however, the NOx catalyst to which the absorbent agent such as potassium is added is exposed to a high temperature for a long period of time, the catalyst may crack to cause deterioration in the durability of the NOx catalyst.

SUMMARY OF THE INVENTION

It is therefore an object of the present invention to provide an exhaust gas purifying catalyst that is able to substantially reduce the deterioration of the exhaust gas purifying performance.

To attain the above object, the present invention provides an exhaust gas purifying catalyst, which includes a carrier and a catalyst layer, and to which at least one material selected from a group of alkali metals and alkali earth metals is added as an absorbent agent. Acid material with a high affinity with respect to the absorbent agent is mixed in the catalyst layer, and an inhibiting layer is formed between the catalyst layer and the carrier so as to inhibit movement of the absorbent agent toward the carrier. Therefore, the acid material fixes the absorbent agent in the catalyst layer, and the inhibiting layer inhibits the movement of the absorbent agent from the catalyst layer toward the carrier. This prevents the evaporation of the absorbent agent and the dissipation of the absorbent agent resulting from its infiltration into the carrier, and also prevents cracking of the catalyst caused by the infiltration of the absorbent agent into the carrier.

BRIEF DESCRIPTION OF THE DRAWINGS

The nature of this invention, as well as other objects and advantages thereof, will be explained with reference to the accompanying drawings, in which like reference characters designate the same or similar parts throughout the figures and wherein.

DETAILED DESCRIPTION OF THE INVENTION

A description will hereunder be given of an exhaust gas purifying catalyst according to the first embodiment of the present invention.

Figure 1:
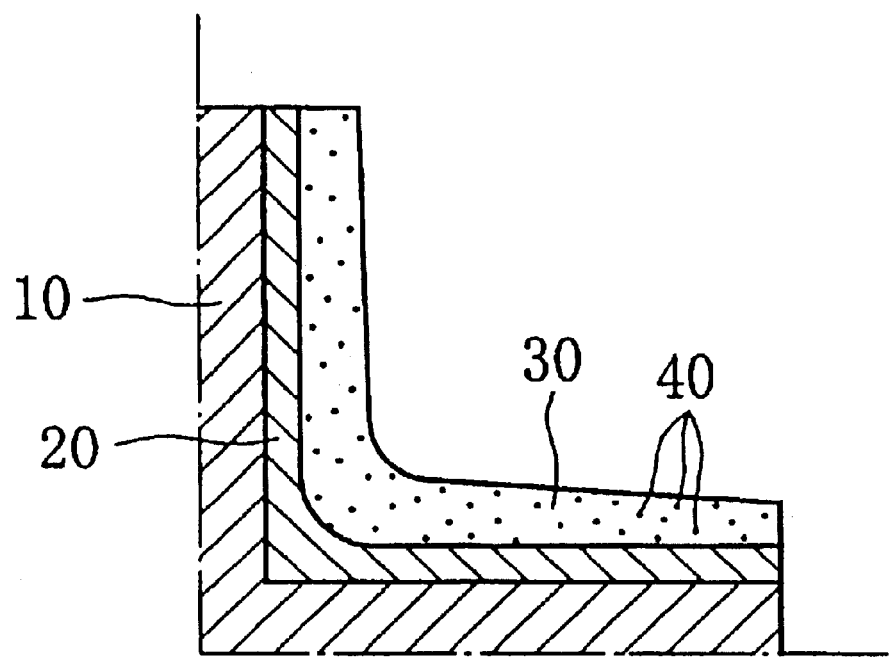
FIG. 1 is a local enlarged sectional view showing a quarter of one cell in a cordierite carrier that is applied to an exhaust gas purifying catalyst according to the first embodiment of the present invention.

The exhaust gas purifying catalyst according to this embodiment is an NOx catalyst having a porous honeycomb (monolith) cordierite carrier comprised of many cells. FIG. 1 shows a quarter of one cell in the cordierite carrier applied to the exhaust purifying catalyst of this embodiment. The cell in the cordierite carrier 10 is, e.g. square. For example, the cordierite carrier 10 is produced by mixing alumina powders, silica powders and magnesia powders in such a manner that the ratio of alumina, silica and magnesia is equal to a cordierite composition, then dispersing the mixture of powders with water, forming the mixture into a honeycomb form, and sintering the honeycomb shaped mixture.

An inhibiting layer 20 covers the surface of the cordierite carrier 10, and a catalyst layer 30 is formed on the surface of the inhibiting layer 20. The inhibiting layer 20 is composed mainly of silica ($SiO_2$). In the catalyst layer 30, noble metals such as platinum (Pt), an NOx absorbent agent such as potassium (K) and barium (Ba), and acid material 40 composed of zeolite are finely dispersed and mixed in the catalyst layer 30.

For example, the inhibiting layer 20 is formed in the following manner. First, a slurry is prepared which includes noble metal such as platinum (Pt); an absorbent agent formed of alkali metal, alkali earth metal, etc. such as potassium (K) and barium (Ba); acid material such as zeolite; and the like. The cordierite carrier 10 is then immersed in the slurry and is sintered after drying. Consequently, the inhibiting layer 20, which is composed mainly of silica, is formed on the surface of the cordierite carrier 10.

The catalyst layer 30 is formed on the surface of the inhibiting layer 20, e.g. in the following manner. First, a slurry is prepared which includes noble metals such as platinum, an NOx absorbent agent such as potassium and barium, and the acid material 40 composed of zeolite. The cordierite carrier 10, on which the inhibiting layer 20 is formed in the above-mentioned manner, is immersed in the slurry. The cordierite carrier 10 is then dried and sintered to thereby form the catalyst layer 30, in which the noble metals and the absorbent agent as well as the acid material 40 are mixed, is formed on the inhibiting layer 20. Typical examples of the absorbent agent are potassium and barium, but the absorbent agent may be composed of any other substances insofar as they are alkali metals or alkali earth metals.

The NOx catalyst with the above arrangement is placed in a case through a cushioning material, and is disposed in an exhaust system of a lean burn internal combustion engine. The NOx catalyst absorbs NOx in the form of nitrite from exhaust gases due to the operation of the absorbent agent dispersed in the catalyst layer 30, and emits the nitrite from the absorbent agent while the engine is operating at a rich air-fuel ratio. The nitrite is then reduced into nitrogen and is emitted from the NOx catalyst.

If the internal combustion engine equipped with the above-described NOx catalyst is operated for a long period of time, the NOx catalyst is exposed to a high temperature. The conventional NOx catalyst, in which the catalyst layer 30 with potassium added is merely formed on the cordierite carrier 10, has such a disadvantage that the purification performance is deteriorated by the reaction consumption due to the infiltration of the potassium into the cordierite carrier 10 and the dissipation of the potassium due to evaporation and the infiltrated potassium generates a chemical compound in the cordierite carrier 10 to crack the catalyst.

To the contrary, the exhaust gas purifying catalyst according to the present embodiment fixes the absorbent agent such as potassium and barium included in the catalyst layer 30 due to the cation exchange ability and reactivity of the acid material 40 such as zeolite, and the inhibiting layer 20 composed mainly of silica inhibits the movement of the absorbent agent from the catalyst layer 30 toward the cordierite carrier 10. This prevents the above-mentioned problems such as dissipation of the absorbent agent and cracking of the catalyst.

The absorbing fixing action and the absorbent agent movement inhibiting action will be described hereinbelow. The zeolite, which is a main component of the acid material 40, is a complex oxide having an excellent capability to fix the absorbent agent (potassium in this embodiment) due to its cation exchange ability. The absorbent agent, which moves in the catalyst layer 30, may be ionized under the presence of high-temperature water moisture. As shown in the conceptual diagram of FIG. 2, the absorbent agent such as potassium ions is fixed due to the cation exchange ability of acid points in the zeolite. The zeolite has a large specific surface area with a three-dimensional net structure, and thus, the absorbent agent is highly diffused on the zeolite. The absorbent agent can be securely fixed.

The cation exchange ability of the zeolite is in inverse proportion to the ratio of $SiO_2/AlO_2$, and the heat-resisting property is in proportion to this ratio. More specifically, if the ratio of $SiO_2/AlO_2$ is small, the acid points are increased with the increase in the quantity of alumina so that the absorbent agent can be fixed more securely. If the ratio of $SiO_2/AlO_2$ is small, however, alumina is removed from the zeolite to deteriorate the heat-resisting property of the acid material 40. Accordingly, the ratio is preferably determined in view of the absorbent agent fixing action and the durability of the acid material 40. The acid material 40 may be either a natural product or a synthetic product, and more preferably, it has a large specific surface area so as to ensure a large physical absorption area. Since titanium dioxide ($TiO_2$) achieves the same effect as the zeolite, the titanium dioxide may be mixed in the catalyst layer 30 instead of zeolite.

Figure 2:
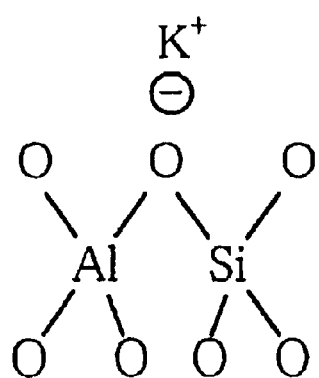
FIG. 2 is a conceptual diagram showing a potassium fixing action that is executed by a cation exchange ability of zeolite.
Figure 3:
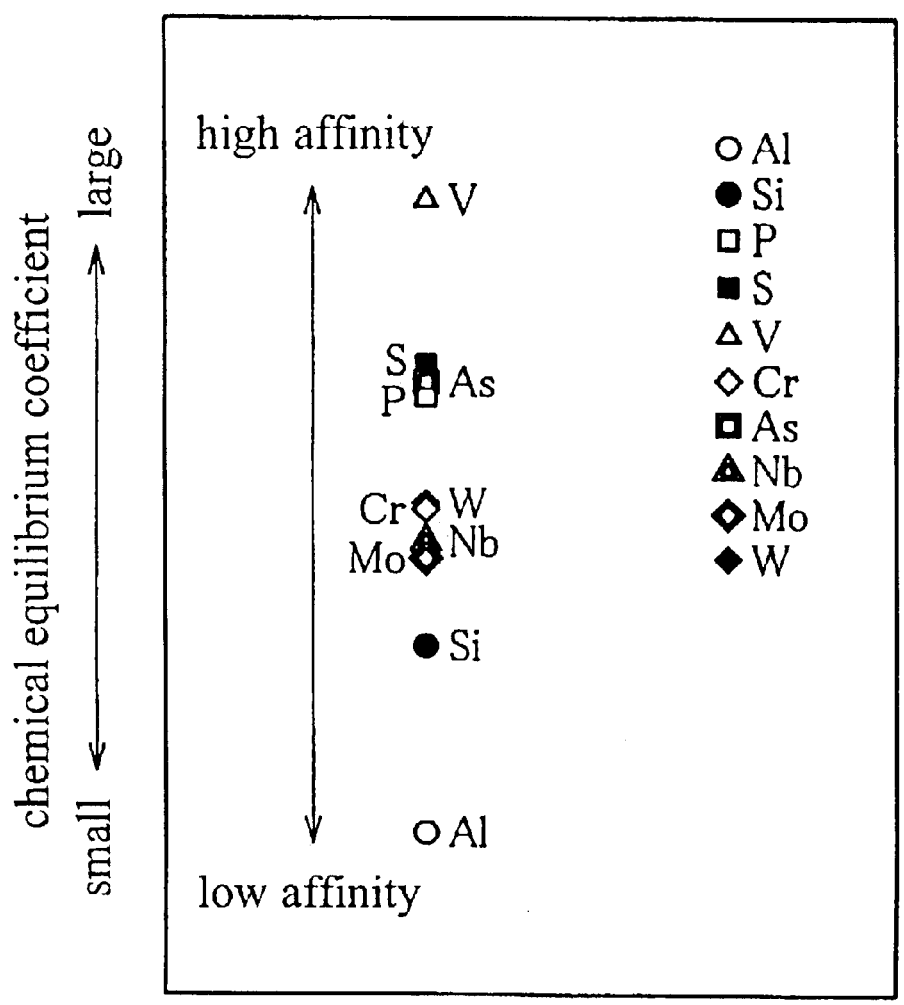
FIG. 3 is a chart showing the affinity of an oxide material with respect to potassium.

The acid material 40 is preferably composed of Group-IV, Group-V and Group-VI transition elements or Group-IV, Group-V and Group-VI typical elements (e.g. Si, P, S, V, Cr, As, Nb, Mo, and W) as shown in FIG. 3, and has a high affinity with respect to alkali metal or alkali earth metal (FIG. 2 shows the affinity with respect to, e.g. potassium). In view of the reactivity with the absorbent agent, the acid material 40 is preferably composed of silicon (Si) or tungsten (W) that never disturbs the reaction of NOx and the absorbent agent in the case where the absorbent agent is composed of potassium.

On the other hand, the inhibiting layer 20 composed mainly of silica has a very high acidity, and the absorbent agent such as potassium and barium in the catalyst layer 30 is composed of alkali metal or alkali earth metal. Thus, if the absorbent agent moves from the catalyst layer 30 toward the inhibiting layer 20, the inhibiting layer 20 fixes the absorbent agent irrespective of the fixing action by the acid material 40. This prevents the infiltration of the absorbent agent into the cordierite carrier 10. The inhibiting layer 20, which achieves the above-mentioned effects, needs the same requirements as the acid material 40 described with reference to FIG. 3. The inhibiting layer 20 may be composed of tungsten instead of silica.

The movement of the absorbent agent may also be inhibited by forming the inhibiting layer from a material such as titanium dioxide, an alkali metal such as barium, a basic material such as barium oxide (BaO) or the like. In this case, the inhibiting layer has the same property as the absorbent agent, and thus repulses the approaching absorbent agent to decrease the inductivity of the absorbent agent into the cordierite carrier 10.

Further, the movement of the absorbent agent may be inhibited by forming the inhibiting layer 20 of a material such as zeolite having a large specific surface area, an element chemical compound composed mainly of stable basic material with a high molecular weight such as barium sulfate ($BaSO_4$), a material with a small crystal lattice, or the like. For example, if the inhibiting layer 20 is composed mainly of zeolite, the absorbent agent is highly diffused in the inhibiting layer with a large specific surface area. This prevents the infiltration of the absorbent agent into the cordierite carrier 10. Moreover, the zeolite has the excellent capability to fix the absorbent agent due to its cation exchange ability as stated above, and thus, the absorbent agent fixing action of the zeolite prevents the infiltration of the absorbent agent into the cordierite carrier 10.

With this arrangement, the exhaust gas purifying catalyst of the present embodiment prevents the absorbent agent from infiltrating into the cordierite carrier 10 so as to avoid the reactive consumption and the evaporation of the absorbent agent, and also prevents cracking of the cordierite carrier 10 to improve the durability.

To confirm the above-described operation of the present embodiment, the inventors produced an NOx catalyst in which a catalyst layer 30 including potassium as an absorbent agent is formed on the cordierite carrier 10, and found the potassium content in the unused NOx catalyst with an XRF method (fluorescent X-ray spectroscopic analysis method). The inventors then found the potassium content in the catalyst which had been used at a high temperature for a long period of time (e.g. 32 hours at 850° C.), and divided the difference in the potassium content between the unused catalyst and the used catalyst by the initial potassium content to find the quantity of dissipated potassium. As a result, the quantity of dissipated potassium in the conventional catalyst was found to be between 10% and 50%. According to the test results, the potassium content in the catalyst layer 30 after the heat duration test was larger than that in the conventional catalyst.

Further, we compared the NOx purification efficiency after the heat duration test. It was found that the NOx catalyst of the present embodiment maintained the high NOx purification efficiency irrespective of the catalyst temperature.

On the other hand, the exhaust gases include a slight amount of HC even when the engine is operating at the lean air-fuel ratio. Since the zeolite has the excellent capability to absorb reduced substances such as HC, the HC absorbed onto the zeolite facilitates the decomposition of nitrate and sulfate in the NOx absorbent agent. More specifically, even when the engine is operating at the lean air-fuel ratio, the zeolite having the HC absorbing ability continuously decomposes the nitrate and the sulfate in the NOx absorbent agent by using a slight amount of HC included in the exhaust gases, thereby recovering the NOx absorbing capability of the catalyst. It is possible to use various types of zeolite such as MFI type, Y type, X type, mordenite, ferrierite and β (beta) type. The zeolite, which corresponds to the composition of the exhaust gases, should be selected in view of the structural relevancy with respect to the absorbed HC.

Although sulfate composed of sulfur deteriorates the purification capability of the NOx catalyst, the exhaust gas-purifying catalyst of the present invention is able to diffuse and holds the NOx absorbent agent such as potassium in the catalyst layer 30 to thereby inhibit the growth of the sulfate.

That completes the description of the first embodiment; however, it should be understood that there is no intention to limit the invention to the specific forms disclosed, but on the contrary, the invention is to cover all modifications, alternate constructions and equivalents. For example, relatively small particles of the acid material 40 are mixed in the catalyst layer 30 according to the first embodiment, but relatively large particles or blocks of the acid material 40 may be mixed in the catalyst layer 30.

There will now be described an exhaust gas purifying catalyst according to the second embodiment of the present invention.

This embodiment aims at maintaining the noble metal oxidizing action in the catalyst layer of the catalyst and the NOx absorbing/purifying capability of the catalyst at a satisfactory level, and improving the durability of the catalyst. The catalyst of this embodiment has basically the same structure as the first embodiment (FIG. 1), but is different from the first embodiment in that a second catalyst layer 50 is formed on the external surface of a catalyst layer (hereinafter referred to as the first catalyst layer) as shown in FIG. 7.

Figure 7:
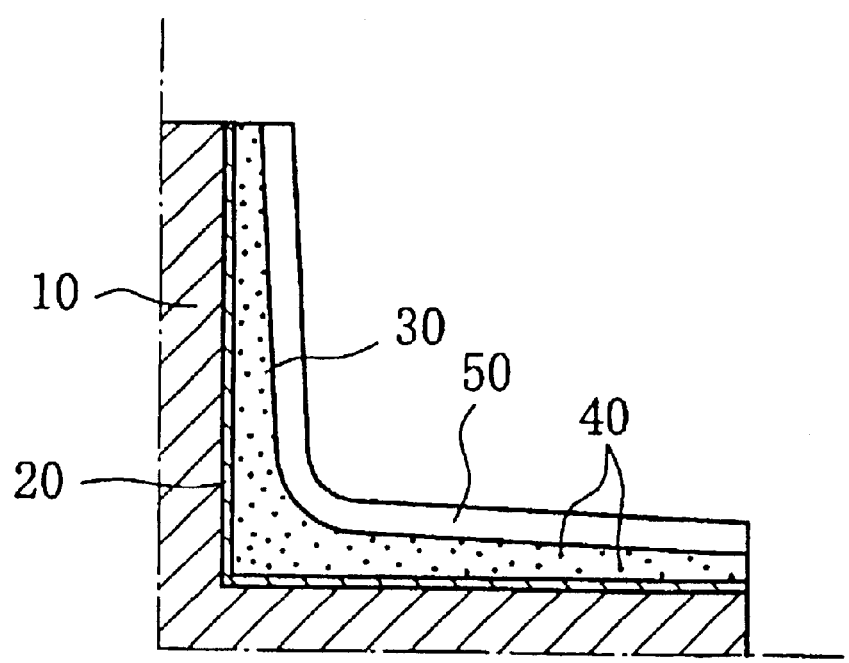
FIG. 7 is a local enlarged sectional view showing a quarter of one cell in an exhaust gas purifying catalyst according to the second embodiment of the present invention.

As shown in FIG. 7, the exhaust gas purifying catalyst comprises the cordierite carrier 10, the inhibiting layer 20 which covers the surface of the cordierite carrier 10, the first catalyst layer 30 which is formed on the surface of the inhibiting layer 20 and to which the acid material 40 is added, and the second catalyst layer 50. The structures of the carrier 10, the inhibiting layer 20 and the first catalyst layer 30 are the same as those of the first embodiment, and thus a description thereof will be omitted. The second catalyst layer 50 is different from the first catalyst layer 30 in that it does not include the acid material 40.

The exhaust gas purifying catalyst with the above arrangement is produced by immersing the cordierite carrier 10, on which the inhibiting layer 20 and the first catalyst layer 30 are sequentially formed, in a slurry including the noble metals and the NOx absorbent agent and then drying and sintering the cordierite carrier 10 in the same procedure as in the first embodiment.

As stated previously, the NOx absorbent agent with a high electron-donating property deteriorates the oxidizing performance of the noble metals and causes deterioration in the NOx absorbing and purifying capability of the catalyst. According to the present embodiment, however, the catalyst layer of the catalyst comprises the first catalyst layer 30 including the acid material 40 and the second catalyst layer 50 that is formed on the external surface of the first catalyst layer 30 and does not include the acid material 40, so that the NOx absorbent agent in the second catalyst layer 50 can easily move toward the first catalyst layer 30. Therefore, the absorbent agent is concentrated in the first catalyst layer 50, and the quantity of the absorbent agent in the second catalyst layer 50 is decreased. As a result, the oxidizing action of the noble metals in the second catalyst layer 50 cannot easily be deteriorated, and the oxidizing action of the noble metals in the entire catalyst layer and more particularly in the second catalyst layer 50 and the absorbing and purifying capability of the catalyst can be maintained at a high level. This inhibits the evaporation of the absorbent agent from the second catalyst layer 50, and maintains the absorbing capability of the catalyst at a satisfactory level. Further, the second catalyst layer 50 protects the first catalyst layer 30 and the inhibiting layer 20 from high-temperature exhaust gases. This prevents the heat degradation of the first catalyst layer 30 and the inhibiting layer 20 and improves the durability of the catalyst as a whole.

As is the case with the first embodiment, a heat duration test was conducted for the exhaust gas purifying catalyst of the present embodiment. According to the test results, the potassium content in the first and second catalyst layers 30, 50 after the heat duration test was larger than that in the conventional catalyst as indicated by the third rectangle from the left in FIG. 4. The NOx purification rate after the heat duration test was improved over the whole range of the catalyst temperature as indicated by a square mark in FIG. 5.

There will now be described an exhaust gas purifying catalyst according to the third embodiment of the present invention.

As is the case with the second embodiment, the third embodiment aims at maintaining the noble metal oxidizing action in the catalyst layer and at a satisfactory level and improving the durability of the catalyst. The catalyst of this embodiment, however, is different from that of the second embodiment in the positions of both catalyst layers.

Figure 8:
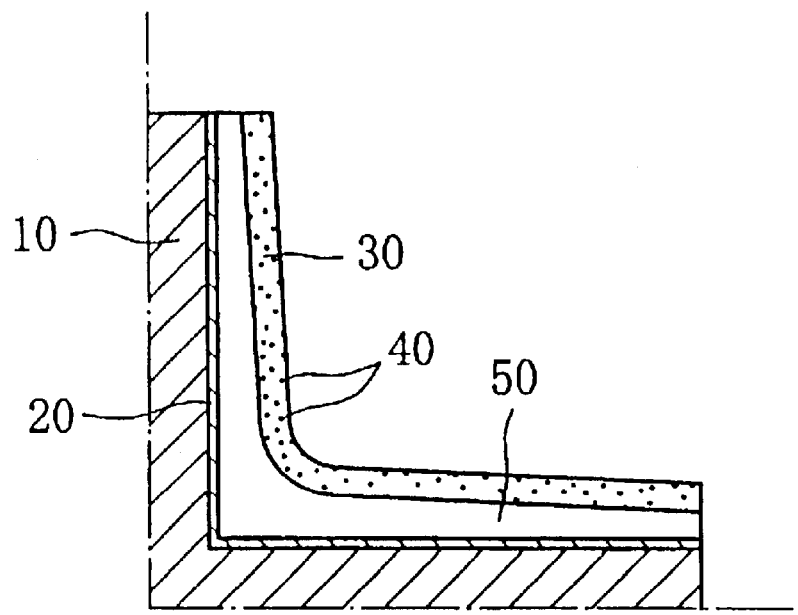
FIG. 8 is a local enlarged sectional view showing a quarter of one cell in an exhaust gas purifying catalyst according to the third embodiment of the present invention.

As shown in FIG. 8, the exhaust gas purifying catalyst of this embodiment comprises the cordierite carrier 10, the inhibiting layer 20 which covers the surface of the cordierite carrier 10, the second catalyst layer 50 which is formed on the surface of the inhibiting layer 20 and does not include the acid material 40, and the first catalyst layer 30 which is formed on the surface of the second catalyst layer 50 and includes the acid material 40. In short, the second catalyst layer 50 is provided between the inhibiting layer 20 and the first catalyst layer 30.

The exhaust gas purifying catalyst with the above arrangement is produced in the following manner. The cordierite carrier 10, on which the inhibiting layer 20 and is formed, is immersed in a slurry including the noble metals and the NOx absorbent agent and then drying and sintering the cordierite carrier 10 to obtain the carrier 10, on which the inhibiting layer 20 and the second catalyst layer 50 are formed, in the same procedure as in the first embodiment. The cordierite carrier 10 is immersed in a slurry including noble metals, the NOx absorbent agent and the acid material 40 and is then dried and sintered to thereby obtain the exhaust gas purifying catalyst on which the inhibiting layer 20, the second catalyst layer 50 and the first catalyst layer 30 are formed.

In the exhaust gas purifying catalyst that is produced in the above-mentioned manner, the absorbent agent is concentrated in the first catalyst layer 30. Therefore, the oxidizing action of the noble metals in the second catalyst layer 50 cannot easily be deteriorated, and the oxidizing action of the noble metals in the entire catalyst layer and more particularly in the second catalyst layer 50 and the absorbing and purifying capability of the catalyst can be maintained at a high level. According to the present embodiment, if the NOx absorbing and purifying capability of the catalyst deteriorates due to the generation of nitrate and sulfate caused by the chemical reaction of the absorbent agent with nitrogen components and sulfur components in the exhaust gases, the air-fuel ratio of the exhaust gas is made rich so as to recover the NOx absorbing and purifying capability. According to the present embodiment, the absorbent agent is concentrated in the first catalyst layer 30, i.e. on the external surface of the catalyst, and the nitrate and the sulfate are concentrated on the external surface of the catalyst and easily come into contact with the exhaust gases. Therefore, even if the air-fuel ratio of the exhaust gases is maintained at a rich ratio for a short period of time or if the degree of richness in the air-fuel ratio is small, the absorbing and purifying capability of the catalyst can be recovered sufficiently. In short, it is possible to inhibit the deterioration in fuel economy caused by the richness of the exhaust gas.

Figure 4:
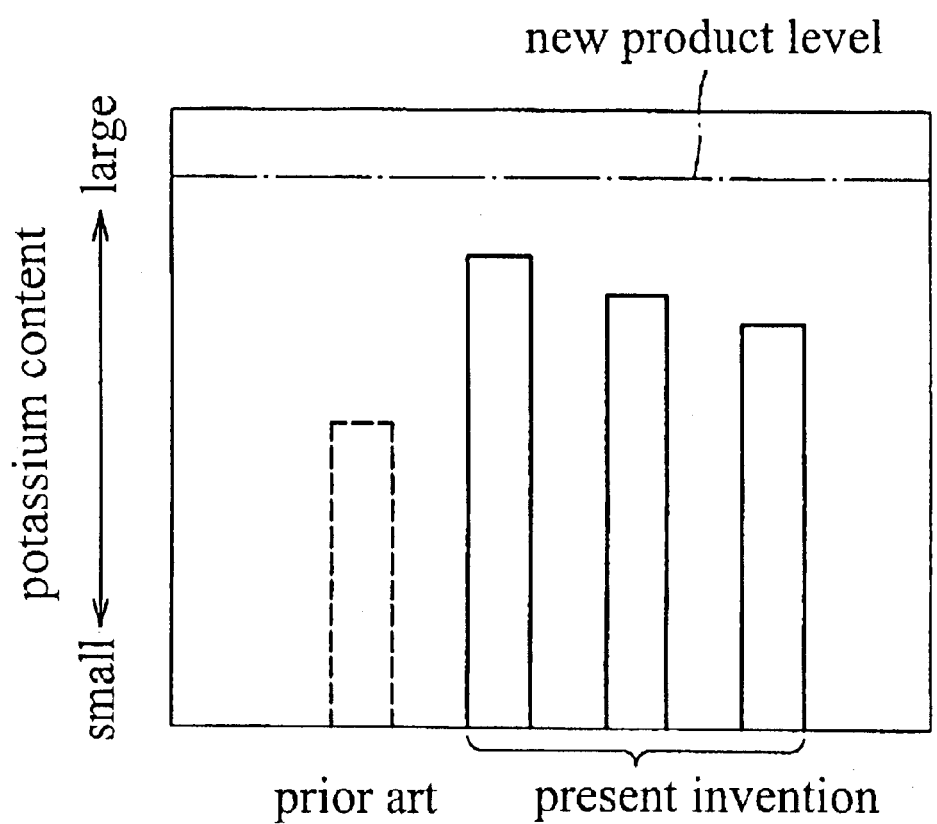
FIG. 4 is a chart showing the potassium content in a catalyst layer after a heat duration test.
Figure 5:
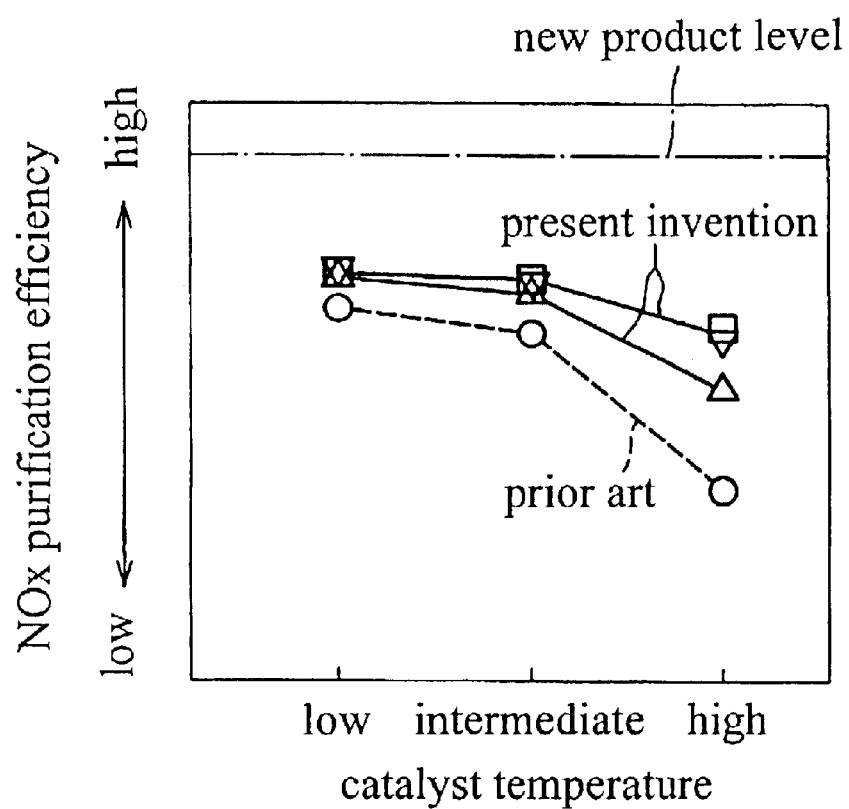
FIG. 5 is a chart showing the purification efficiency of an NOx catalyst after a heat duration test.

According to the results of the heat duration text conducted for the exhaust gas purifying catalyst of the present embodiment, the potassium content after the heat duration test was large as indicated by the fourth rectangle from the left in FIG. 4. The NOx purification rate after the heat duration test was maintained at a high level as indicated by an inverse triangle mark in FIG. 5.

It should be understood, however, that there is no intention to limit the invention to the first embodiment through the third embodiment disclosed, but on the contrary, the invention is to cover all modifications, alternate constructions and equivalents falling within the spirit and scope of the invention as expressed in the appended claims.

Figure 6:
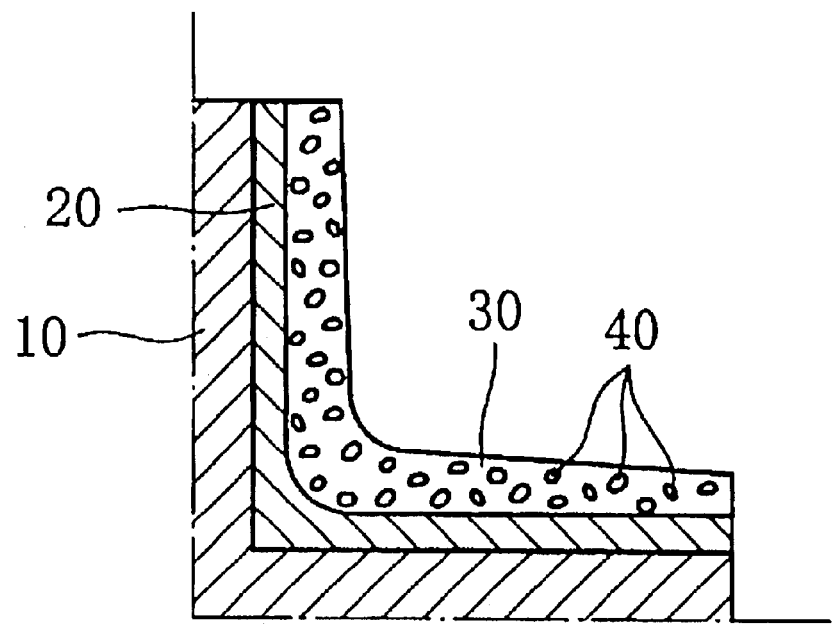
FIG. 6 is a local enlarged sectional view showing a quarter of one cell in an exhaust gas purifying catalyst according to a modification example of the first embodiment of the present invention.

For example, the honeycomb cordierite carrier 10 is employed as a porous carrier according to the first embodiment through the third embodiment, but the present invention may also be applied to an exhaust gas purifying catalyst having a carrier that is composed of other material than cordierite. If a metal carrier is used, the infiltration of the NOx absorbent agent into the carrier causes almost no problem whereas the evaporation of the absorbent agent and the deterioration in the exhaust gas purifying capability of the catalyst are prevented. If the honeycomb cordierite carrier is used, a cell in the cordierite carrier should not necessarily be square but it may be triangular or hexagonal. In the second and third embodiments, the blocks of acid material 40 may be mixed in the first catalyst layer 30 as is the case with the modified example (FIG. 6) of the first embodiment.

What is claimed is:

1. An exhaust gas purifying catalyst comprising:
   a carrier;
   a catalyst layer; and
   an inhibiting layer formed between said catalyst layer and said carrier;
   wherein at least one material selected from alkali metals is contained in the catalyst layer as an absorbent agent;
   wherein an acid material with a high affinity with respect to said absorbent agent is mixed in said catalyst layer; and
   wherein the inhibiting layer inhibits movement of said absorbent agent toward said carrier.

2. An exhaust gas purifying catalyst according to claim 1, further comprising:
   a second catalyst layer formed on an external surface of said catalyst layer; and
   wherein at least one material selected from alkali metals contained in the second catalyst layer as an absorbent agent.

3. An exhaust gas purifying catalyst according to claim 1, further comprising:
   a second catalyst layer formed between said catalyst layer and said inhibiting layer; and
   wherein at least one material selected from alkali metals contained in the second catalyst layer as an absorbent agent.

4. An exhaust gas purifying catalyst according to claim 1, wherein said acid material or said inhibiting layer is composed of at least one of the following materials:
   an acid oxide including at least one acid substance selected from a group consisting of Group-IV, Group-V and Group-VI transition elements, and Group-IV, Group-V and Group-VI non-transition elements;
   a complex oxide including said at least one acid substance;
   a material that does not inhibit reaction of a nitrogen oxide and said absorbent agent; and
   a material that absorbs a reduced substance.

5. An exhaust gas purifying catalyst according to claim 1, wherein said acid material is composed of zeolite; and
   wherein said inhibiting layer is composed of silica ($SiO_2$).

6. An exhaust gas purifying catalyst according to claim 1, wherein said inhibiting layer is composed of at least one of the following materials:
   a layer with a high acidity,
   a layer with a large specific surface area,
   a layer with a small crystal lattice,
   a layer composed of a compound, and
   a layer with a high alkalinity.

7. An exhaust gas purifying catalyst according to claim 1, wherein said absorbent agent includes potassium (K); and
   wherein said carrier is composed of a porous carrier.

8. A method of manufacturing an exhaust gas purifying catalyst comprising:
   forming a carrier;
   forming an inhibiting layer on the carrier; and
   forming a catalyst layer on the inhibiting layer;
   wherein at least one material selected from alkali metals is added to the catalyst layer as an absorbent agent;
   wherein an acid material with a high affinity with respect to said absorbent agent is mixed in said catalyst layer; and wherein the inhibiting layer inhibits movement of said absorbent agent toward said carrier.

9. A method of manufacturing an exhaust gas purifying catalyst according to claim 8, further comprising:

forming a second catalyst layer on an external surface of said catalyst layer; and wherein at least one material selected from alkali metals is added to the second catalyst layer as an absorbent agent.

10. A method of manufacturing an exhaust gas purifying catalyst according to claim 8, further comprising:

forming a second catalyst layer between said catalyst layer and said inhibiting layer; and wherein at least one material selected from alkali metals is added to the second catalyst layer as an absorbent agent.

11. A method of manufacturing an exhaust gas purifying catalyst according to claim 8, wherein said acid material or said inhibiting layer is composed of at least one of the following materials:

an acid oxide including at least one acid substance selected from a group consisting of Group-IV, Group-V and Group-VI transition elements, and Group-IV, Group-V and Group-VI non-transition elements;

a complex oxide including said at least one acid substance;

a material that does not inhibit reaction of a nitrogen oxide and said absorbent agent; and a material that absorbs a reduced substance.

12. A method of manufacturing an exhaust gas purifying catalyst according to claim 8, wherein said acid material is composed of zeolite; and wherein said inhibiting layer is composed of silica ($SiO_2$).

13. A method of manufacturing an exhaust gas purifying catalyst according to claim 8, wherein said inhibiting layer is composed of at least one of the following materials:

a layer with a high acidity, a layer with a large specific surface area, a layer with a small crystal lattice, a layer composed of a compound, and a layer with a high alkalinity.

14. A method of manufacturing an exhaust gas purifying catalyst according to claim 8, wherein said absorbent agent includes potassium (K); and wherein said carrier is composed of a porous carrier.

* * * * *